United States Patent
Kozakai et al.

(10) Patent No.: US 8,860,254 B2
(45) Date of Patent: Oct. 14, 2014

(54) POWER FEEDING APPARATUS AND WIRELESS POWER FEEDING SYSTEM

(75) Inventors: Osamu Kozakai, Kanagawa (JP); Hiroyuki Mita, Saitama (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 13/164,969

(22) Filed: Jun. 21, 2011

(65) Prior Publication Data
US 2012/0007439 A1    Jan. 12, 2012

(30) Foreign Application Priority Data
Jul. 9, 2010    (JP) .................. 2010-156548

(51) Int. Cl.
| H01F 27/42 | (2006.01) |
| H02J 5/00 | (2006.01) |
| H01F 38/14 | (2006.01) |
| H01F 27/36 | (2006.01) |

(52) U.S. Cl.
CPC ........... H02J 5/005 (2013.01); H01F 38/14 (2013.01); H01F 27/36 (2013.01)
USPC ........... 307/104; 307/39; 307/82; 307/149; 307/84; 324/300; 324/322; 343/745; 343/860; 455/78; 455/83; 333/32; 333/129

(58) Field of Classification Search
CPC ........... H02J 5/005; H02J 7/025; H01F 38/14
USPC ........... 307/104; 320/103, 104, 108, 109
See application file for complete search history.

(56) References Cited

U.S. PATENT DOCUMENTS

| 8,427,098 | B2 * | 4/2013 | Moore et al. ........... 320/103 |
| 8,598,743 | B2 * | 12/2013 | Hall et al. ............. 307/104 |
| 2005/0029919 | A1 | 2/2005 | Notohara et al. |
| 2010/0277121 | A1 * | 11/2010 | Hall et al. ............. 320/108 |
| 2012/0153732 | A1 * | 6/2012 | Kurs et al. ............. 307/104 |

FOREIGN PATENT DOCUMENTS

| JP | 10-163889 | 6/1998 |
| JP | 2005-217120 | 8/2005 |

OTHER PUBLICATIONS http:/www.d.dendai.ac.jp/lab_site/dlab/2-3d-2/jiki.pdf.
Shin Nakagawa; 2 Test Production of Non-Contact Power Feeding type Switching Power Source Made on Experimental Basis; Transistor Technology 2004; pp. 195 to 205.

* cited by examiner

*Primary Examiner* — Rexford Barnie
*Assistant Examiner* — Jagdeep Dhillon
(74) *Attorney, Agent, or Firm* — Dentons US LLP (57) ABSTRACT

Disclosed herein is a power feeding apparatus, including: a power feeding portion adapted to feed an electric power in a wireless manner; and a storage body storing therein the power feeding portion. The storage body includes a main body, a first storage portion formed within the main body and storing therein the power feeding portion, and at least one second storage portion formed so as to be adapted to store or retrieve a power receiving apparatus as a storage object in or from the main body, the electric power of the power feeding portion stored in the first storage portion being adapted to be fed from the at least one second storage portion. At least a magnetically shielding portion is formed in an outer peripheral portion, and the at least one second storage portion forms a magnetically closed space in a state of being stored in the main body.

14 Claims, 12 Drawing Sheets

POWER FEEDING APPARATUS AND WIRELESS POWER FEEDING SYSTEM

BACKGROUND

The present disclosure relates to a power feeding apparatus and a wireless power feeding system each of which utilizes a non-contact power feeding system and supplies and receives an electric power in a non-contact (wireless) manner, and which can be applied to a storage body such as a chest of drawers or a storage box.

An electromagnetic induction system is known as a system for carrying out supply of an electric power in a wireless manner.

In addition, in recent years, a wireless power feeding and charging system using a system called a magnetic field sympathetic resonance system utilizing an electromagnetic resonance phenomenon has attracted attention.

In the non-contact power feeding system as the electromagnetic induction system which has already been generally used at present, a power feeding source and a power feeding destination (electric power receiving side) have to hold a magnetic flux in common. Thus, for the purpose of effectively feeding the electric power, the power feeding source and the power feeding destination have to be disposed in close proximity to each other. Also, axis alignment for the coupling between the power feeding source and the power feeding destination is also important.

On the other hand, the non-contact power feeding system using the electromagnetic sympathetic resonance phenomenon has advantages that it can feed the electric power at a distance as compared with the case of the electromagnetic induction system because of the principles of the electromagnetic sympathetic resonance phenomenon, and even when the axis adjustment is poor a little, the feeding efficiency is not reduced so much.

It is noted that an electric field sympathetic resonance system using the electromagnetic sympathetic resonance phenomenon is known in addition to the magnetic field sympathetic resonance system using the electromagnetic sympathetic resonance phenomenon.

In the wireless power feeding system of the magnetic field sympathetic resonance type, the axis alignment is unnecessary, and it is possible to lengthen the power feeding distance.

Now, the magnetic field generated by a coil in the wireless power feeding system is necessary for the transmission of the electric power. Also, the regulations for the intensity of the circumferential electromagnetic field are carried out in the form of laws and guidelines in countries from a viewpoint of interference with peripheral electronic apparatuses or protection of the human body.

A first technique disclosed Transistor Technology 2004. 2 Test Production of Non-Contact Power Feeding Type Switching Power Source Made On Experimental Basis by Shin Nakagawa pp. 195 to 205 (referred to as Non Patent Document 1 hereinafter), http://www.d.dendai.ac.jp/lab_site/dlab/2-3d-2/jiki.pdf (referred to as Non Patent Document 2 hereinafter) and a second technique disclosed in Japanese Patent Laid-Open No. Hei 10-163889 (referred to as Patent Document 1 hereinafter) are known as a technique capable of suppressing an influence of the magnetic field exerted on the outside in the wireless power feeding.

Figure 1A:
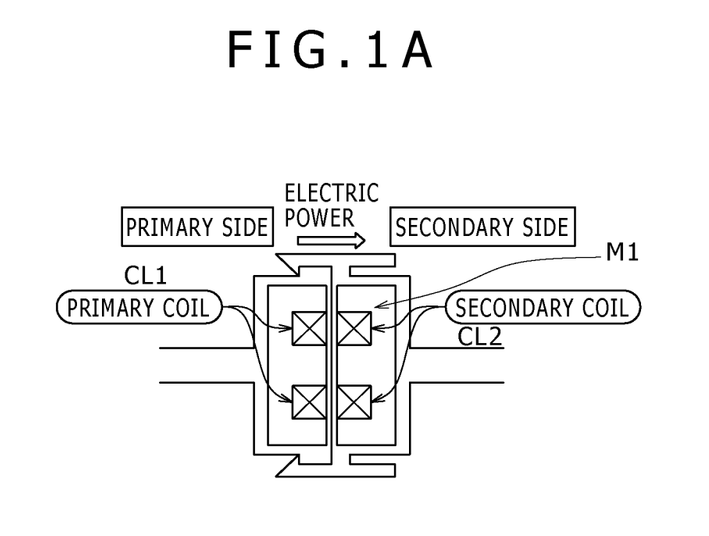
FIGS. 1A and 1B are respectively a view and a circuit diagram explaining a first technique capable of suppressing an influence of a magnetic field exerted on the outside.
Figure 1B:
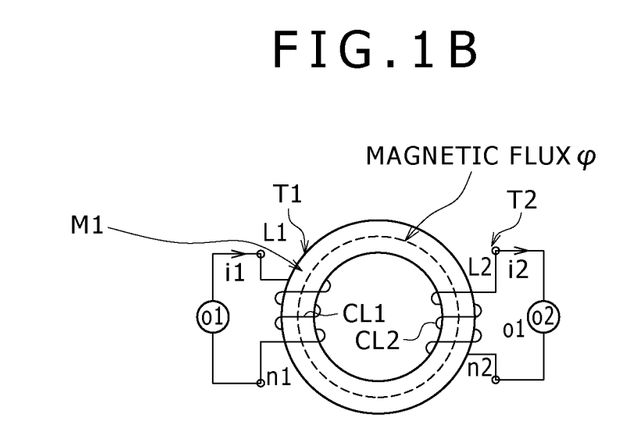

FIGS. 1A and 1B are respectively a view and a circuit diagram explaining the first technique capable of suppressing the influence of the magnetic field exerted on the outside.

With the first technique, coils CL1 and CL2 are wound around a magnetic material M1 to form a primary side transformer T1, and a secondary side transformer T2, respectively.

With regard to the transformers T1 and T2 for a non-contact power feeding type switching power source shown in FIG. 1A, a combination of the primary side transformer and the second side transformer is readily changed.

In the first technique, an idea that a transformer coupling portion is spatially separated becomes the starting point in the non-contact power feeding. When the transformer is used, a magnetic flux passes through the side of the magnetic material of the transformer and does not basically leak to the outside.

Figure 2:
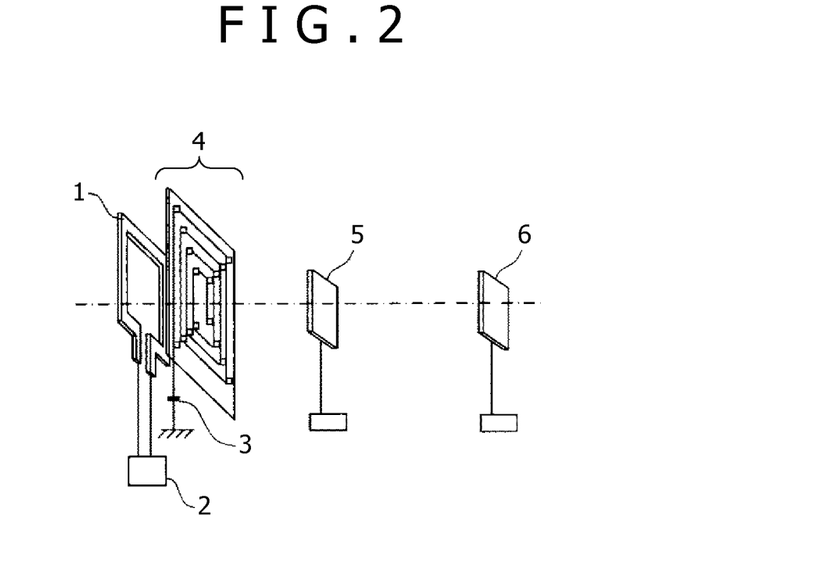
FIG. 2 is a view explaining a second technique capable of suppressing an influence of a magnetic field exerted on the outside.

FIG. 2 is a view explaining the second technique capable of suppressing the influence of the magnetic field exerted on the outside, and is also a schematic view of an evaluation test apparatus.

In FIG. 2, reference numeral 1 designates a loop antenna, reference numeral 2 designates a drive power source, reference numeral 3 designates a ground contact point, reference numeral 4 designates an electromagnetic wave shield, reference numeral 5 designates magnetic field intensity measuring equipment, and reference numeral 6 designates electric field intensity measuring equipment.

In the first technique disclosed in Patent Document 1, the electromagnetic wave shield 4 is disposed in the vicinity of the loop antenna (transmission antenna) 1, thereby reducing the remote electric field intensity while the near magnetic field intensity is maintained.

The electromagnetic wave shield 4 is composed of a coil. One end of the electromagnetic wave shield 4 is opened, and the other end thereof is grounded to the ground GND at a ground contact point 3.

SUMMARY

However, with a method for use in the first technique, the magnetic field can be substantially confined inside the magnetic material. However, it is thought that an interval of the coils (magnetic materials) is approximately about 5 mm or less, and thus the coils (magnetic materials) are difficult to largely separate from each other. In addition, the alignment has to be strictly carried out so as to fall within several millimeters.

It is disclosed in Patent Document 1 that with the method for use in the first technique, the attenuation of the remote electric field intensity is about 10 dB. In a word, it is difficult to obtain the large attenuation of 20 dB or more.

The present disclosure has been made in order to solve the problems described above, and it is therefore desirable to provide a power feeding apparatus and a wireless power feeding system each of which is capable of largely increasing a distance between coils and largely attenuating a remote electromagnetic field intensity while a near magnitude field intensity is maintained, in a word, capable of fulfilling all of the electromagnetic field intensity regulations in countries while electric power transmission characteristics are maintained.

In order to attain the desire described above, according to an embodiment of the present disclosure, there is provided a power feeding apparatus including: a power feeding portion adapted to feed an electric power in a wireless manner; and a storage body storing therein the power feeding portion. The storage body includes: a main body; a first storage portion formed within the main body and storing therein the power feeding portion; and at least one second storage portion formed so as to be adapted to store or retrieve a power receiving apparatus as a storage object in or from the main body, the electric power of the power feeding portion stored in the first storage portion being adapted to be fed from the at least one second storage portion. In the main body, at least a magnetically shielding portion is formed in an outer peripheral portion, and the at least one second storage portion forms a magnetically closed space in a state of being stored in the main body.

According to another embodiment of the present disclosure, there is provided a wireless power feeding system including: a power feeding apparatus; and a power receiving apparatus receiving an electric power fed from the power feeding apparatus with a magnetic field sympathetic resonance relationship. The power feeding apparatus includes: a power feeding portion adapted to feed an electric power in a wireless manner; and a storage body storing therein the power feeding portion. The storage body includes: a main body; a first storage portion formed within the main body and storing therein the power feeding portion; and at least one second storage portion formed so as to be adapted to store or retrieve a power receiving apparatus as a storage object in or from the main body, the electric power of the power feeding portion stored in the first storage portion being adapted to be fed from the at least one second storage portion; and in the main body, at least a magnetically shielding portion is formed in an outer peripheral portion, and the at least one second storage portion forms a magnetically closed space in a state of being stored in the main body.

As set forth hereinabove, according to the present disclosure, the distance between the coils can be largely increased, and the remote electromagnetic field intensity can be largely attenuated while the near magnetic field intensity is maintained. In a word, all of the electromagnetic field intensity regulations in the countries can be fulfilled while the electric power transmission characteristics are maintained.

DETAILED DESCRIPTION OF THE PREFERRED EMBODIMENTS

Embodiments of the present disclosure will be described in detail hereinafter with reference to the accompanying drawings.

Figure 3A:
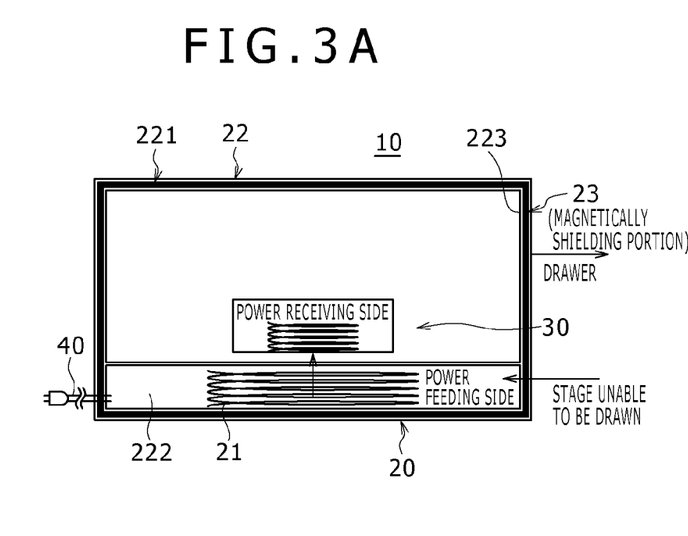
FIGS. 3A and 3B are respectively views showing an entire configuration of a wireless power feeding system according to a first embodiment of the present disclosure.
Figure 3B:
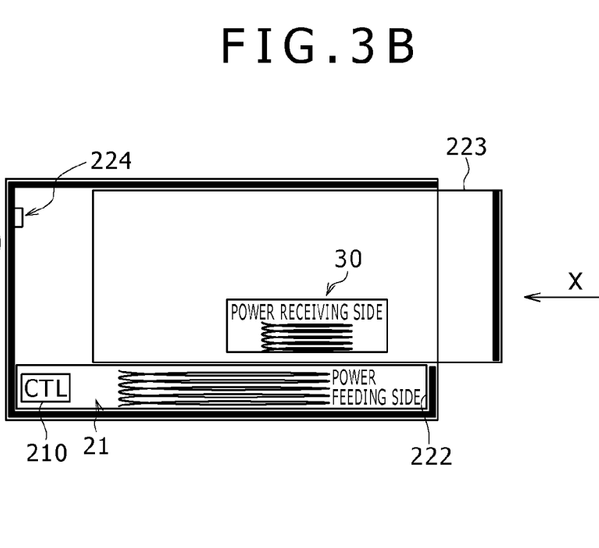

It is noted that the description will be given below in accordance with the following order:
1. First Embodiment of Wireless Power Feeding System
2. Second Embodiment of Wireless Power Feeding System
3. Third Embodiment of Wireless Power Feeding System
4. Fourth Embodiment of Wireless Power Feeding System
5. Fifth Embodiment of Wireless Power Feeding System
6. Sixth Embodiment of Wireless Power Feeding System
7. Seventh Embodiment of Wireless Power Feeding System 1. First Embodiment of Wireless Power Feeding System FIGS. 3A and 3B are views showing an entire configuration of a wireless power feeding system according to a first embodiment of the present disclosure.

Figure 4:
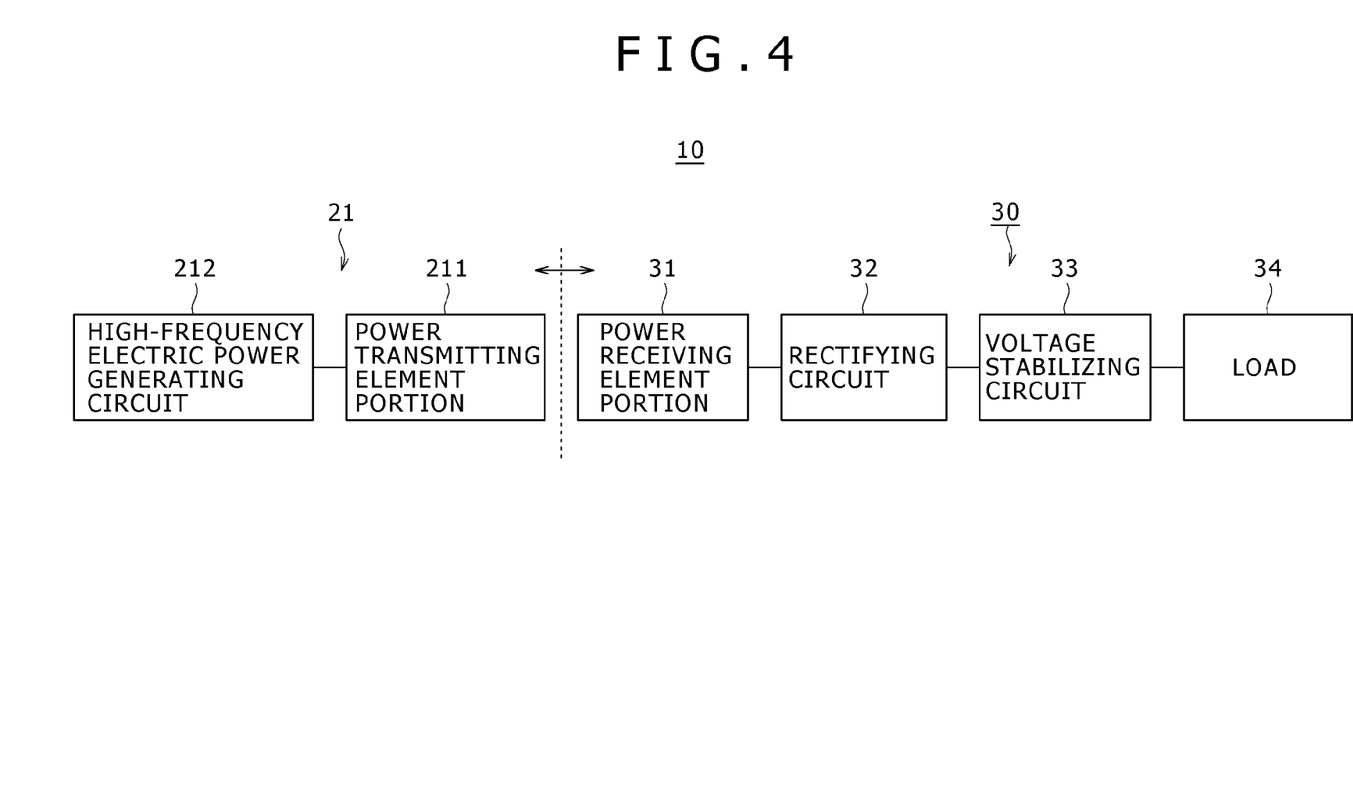
FIG. 4 is a block diagram showing a configuration of a system for feeding and receiving an electric power of the wireless power feeding system according to the first embodiment of the present disclosure.

FIG. 4 is a block diagram showing a configuration of a system for feeding and receiving an electric power of the wireless power feeding system according to the first embodiment of the present disclosure.

Figure 5:
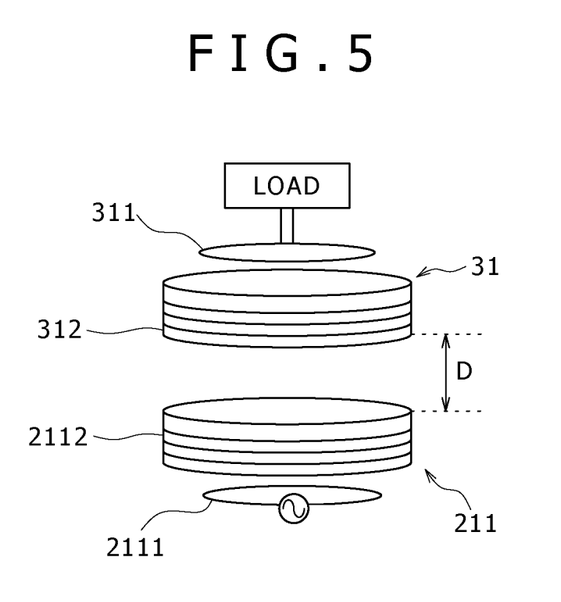
FIG. 5 is a view schematically showing a relationship between a power feeding side coil and a power receiving side coil of the wireless power feeding system according to the first embodiment of the present disclosure.

FIG. 5 is a view schematically showing a relationship between a power feeding side coil and a power receiving side coil of the wireless power feeding system according to the first embodiment of the present disclosure.

A wireless power feeding system 10 includes a power feeding apparatus 20 and a power receiving apparatus 30.

A basic requirement of the first embodiment is the wireless power feeding system 10 which is realized within a magnetically closed space.

For the purpose of forming the magnetically closed space, a magnetic material is wound around and mounted to an external wall of a storage body 22. Thus, a magnetically shielding construction is obtained. As a result, a magnetic field generated inside the magnetically closed space does not leak to the outside of the magnetically closed space. In addition, as will be described later, since a normal magnetic field sympathetic resonance type wireless power feeding system can be operated inside the magnetically closed space, electric power transmission in which a distance between coils is increased can be carried out.

The power feeding apparatus 20 includes a power feeding portion 21 and the storage body 22. In this case, the power feeding portion 21 can feed the electric power in a wireless manner. Also, the storage body 22 stores therein the power feeding portion 21.

In the following description, after a description of a configuration of the storage body 22 which will have been given, configurations and functions of the power feeding portion 21 and the power receiving apparatus 30 will be described in order.

The storage body 22 includes a box-like main body 221 and a first storage portion 222 formed inside of the main body 22. In this case, the first storage portion 222 stores therein the power feeding portion 21.

The storage body 22 includes at least one second storage portion 223. In this case, the electric power of the power feeding portion 21 stored in the first storage portion 222 can be fed to the second storage portion 223. Also, the second storage portion 223 is formed in such a way that the power receiving apparatus 30 as a storage object can be stored or retrieved in or from the box-like main body 221.

In the first embodiment, the second storage portion 222 is formed as a drawer of a chest or a storage box.

In the first embodiment, the first storage portion 222 stores the power feeding portion 21 in a state in which it may be impossible to be drawn, and is fixedly formed at the bottom portion of the main body 221.

Although the power feeding portion 21 is stored in the first storage portion 222, for the purpose of receiving the original electric power, for example, an A.C. cable 40 is connected to the first storage portion 222.

Like the chest or the like, the second storage portion 223 is formed so as to be laminated on an upper layer of the first storage portion 222 formed at the bottom portion of the main body 221.

Also, a magnetically shielding portion 23 made of a magnetic sheet is formed in an outer peripheral portion (external wall portion) of the main body 211 such that the second storage portion 223 defines a magnetically closed space to the main body 221.

It is noted that the magnetically shielding portion 23 made of the magnetic sheet (magnetic material) is cut in a boundary portion with the main body 221 in such a way that the second storage portion 223 can be drawn.

Although the magnetically shielding portion 23 is cut in such a manner, in a state of storage of the second storage portion 223, the high shielding property is maintained in terms of the shielding effect.

In addition, the storage body 22 includes a detecting portion 224 composed of a switch. In the case, the detecting portion 224 serves to detect whether the second storage portion 223 is in a state of being stored in or drawn from the main body 221.

As shown in FIG. 3B, the detecting portion 224 is disposed in the deepest portion (on a left-hand side of FIG. 3B) in a storing or retrieving direction X of the second storage portion 223 in the inside of the main body 221.

Also, the power feeding portion 21 includes a control portion 210. In this case, the control portion 210 carries out control in such a way that the power feeding portion 21 feeds the electric power when the detecting portion 224 detects that the second storage portion 223 is in the state of being stored in the main body 221, and the power feeding portion 21 stops the power feeding when the detecting portion 224 detects that the second storage portion 223 is in the state of being drawn from the main body 221.

Next, a description will be given with respect to the power feeding portion 21 and the power receiving apparatus 30 which are applied to the wireless power feeding system 10 described above.

The power feeding portion 21 includes a power transmitting element portion 211 and a high-frequency electric power generating circuit 212 as an electric power generating portion in addition to the control portion 210.

The power transmitting element portion 211 includes a power feeding coil 2111 as a power feeding element, and a sympathetic resonance coil 2112 as a sympathetic resonance element. Although the sympathetic resonance coil is referred to as the resonance coil as well, in the first embodiment, the term of the sympathetic resonance coil is adopted.

The power feeding coil 2111 is composed of an air-cored coil through which an A.C. current is caused to flow.

The sympathetic resonance coil 2112 is composed of an air-cored coil which is coupled to the power feeding coil 2111 through electromagnetic induction. When the sympathetic resonance coil 2112 agrees in self-resonant frequency with a sympathetic resonance coil 312 of the power receiving apparatus 30, the sympathetic resonance coil 2112 has a magnetic field sympathetic relationship with the sympathetic resonance coil 312. As a result, the electric power is efficiently fed.

The high-frequency electric power generating circuit 212 generates a high-frequency electric power for wireless electric power feeding.

Since the high-frequency electric power generating circuit 212 preferably generates the high-frequency electric power at a high efficiency, a switching amplifier or the like is used as the high-frequency electric power generating circuit 212.

The high-frequency electric power generated by the high-frequency electric power generating circuit 212 is fed (applied) to the power feeding coil 2111 of the power transmitting element portion 211 through an impedance detector, a matching circuit and the like (not shown).

The power receiving apparatus 30 includes a power receiving element portion 31, a rectifying circuit 32, a voltage stabilizing circuit 33, and a load 34.

The power receiving element portion 31 includes a power feeding coil 311 as a power feeding element, and the resonance (sympathetic resonance) coil 312 as a sympathetic resonance element.

An A.C. current is supplied from the sympathetic resonance coil 312 to the power feeding coil 311 through the electromagnetic induction.

The sympathetic resonance coil 312 is composed of an air-cored coil which is coupled to the power feeding coil 311 through the electromagnetic induction. When the power feeding coil 311 agrees in self-resonance frequency with the sympathetic resonance coil 2112 of the power feeding portion 21, the sympathetic resonance coil 312 and the sympathetic resonance coil 2112 show the magnetic field sympathetic resonance relationship. As a result, the electric power is efficiently received.

The rectifying circuit 32 rectifies the A.C. electric power thus received into a D.C. electric power, and supplies the resulting D.C. electric power to the voltage stabilizing circuit 33.

The voltage stabilizing circuit 33 converts the D.C. electric power supplied thereto from the rectifying circuit 32 into a D.C. voltage complying with a specification of an electronic apparatus as an electric power supply destination, and supplies the D.C. voltage obtained through the stabilization to the load 34 as the electronic apparatus.

Next, the principles of the magnetic field sympathetic resonance system will be described.

[Principles of Magnetic Field Sympathetic Resonance System]

The principles of the magnetic field sympathetic resonance system will be described with reference to FIGS. 6 to 9.

Figure 6:
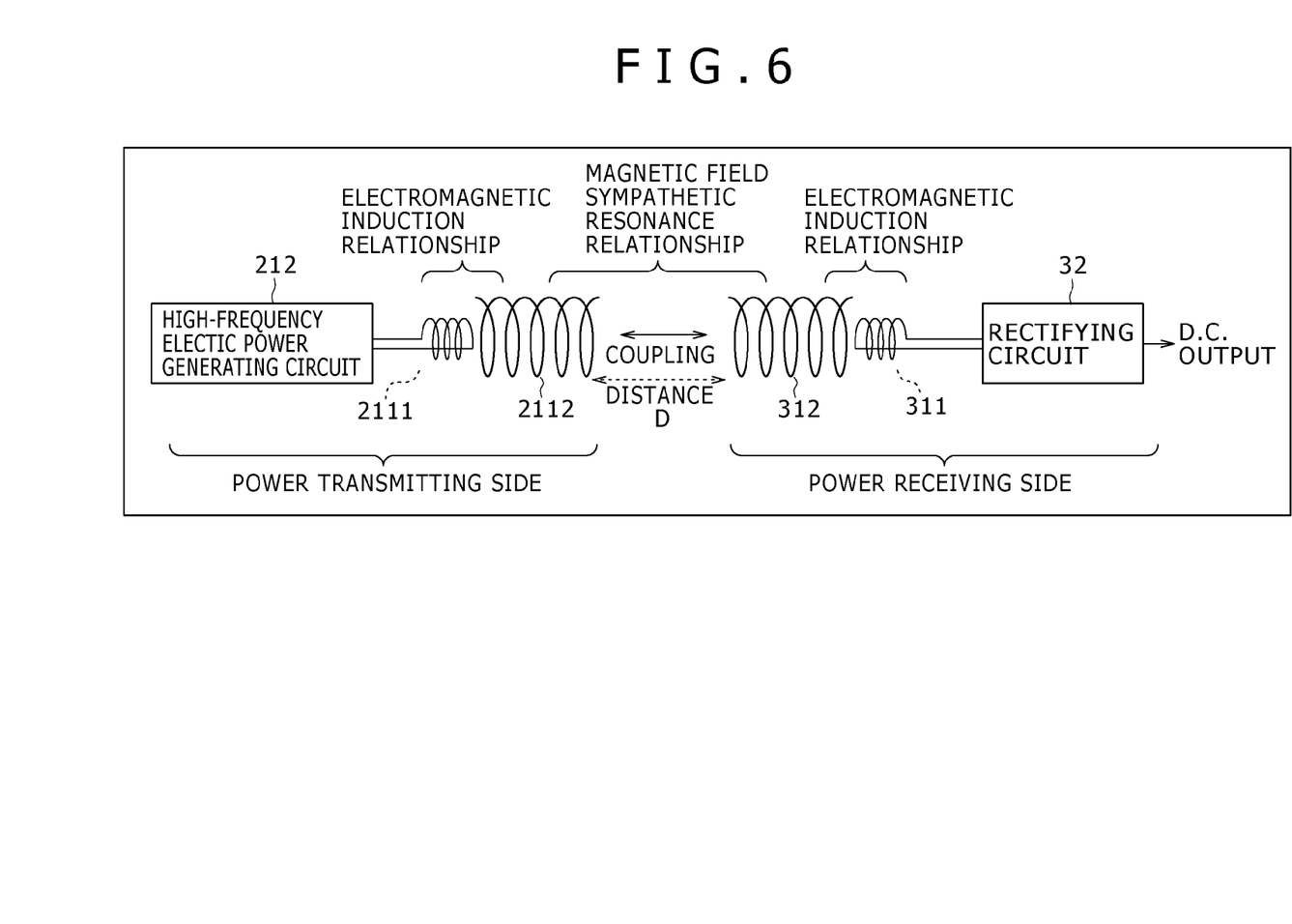
FIG. 6 is a block diagram, partly in circuit, explaining the principles of a magnetic field sympathetic resonance system.

FIG. 6 is a block diagram, partly in circuit, explaining the principles of the magnetic field sympathetic resonance system.

It is noted that in this case, the principles of the magnetic field sympathetic resonance system will be described with the power feeding coil and the sympathetic resonance coil being used as the power feeding element and the sympathetic resonance element, respectively.

The electric field sympathetic resonance system and the magnetic field sympathetic resonance system are known as the electromagnetic sympathetic resonance phenomenon. FIG. 6 shows a basic block in which a power feeding side source and a power receiving side show one-to-one correspondence in a wireless (non-contact) power feeding system utilizing the magnetic field sympathetic resonance system of the electric field sympathetic resonance system and the magnetic field sympathetic resonance system.

Making correspondence to the configurations of FIGS. 3A and 3B, the power feeding side includes a high-frequency electric power generating circuit 212, a power feeding element 2111, and a sympathetic resonance element 2112. Also, the power receiving side includes a sympathetic resonance element 312, a power feeding element 311, and a rectifying circuit 32.

Each of the power feeding elements 2111 and 311, and the sympathetic resonance elements 2112 and 312 is composed of an air-cored coil.

On the power feeding side, the power feeding element 2111 and the sympathetic resonance element 312 are strongly coupled to each other through the electromagnetic induction. Likewise, on the power receiving side, the power feeding element 311 and the sympathetic resonance element 312 are strongly coupled to each other through the electromagnetic induction.

When the self-resonant (sympathetic resonant) frequencies of the air-cored coils composing the sympathetic resonance element 2112 on the power feeding side and the sympathetic resonance element 312 on the power receiving side, correspondingly, agree with each other, the magnetic field resonance relationship is obtained between the sympathetic resonance elements 2112 and 312. As a result, a coupling amount becomes maximum, and a loss becomes minimum.

The A.C. current is supplied from the high-frequency electric power generating circuit 212 to the power feeding element 2111, and a current is induced in the sympathetic resonance element 2112 through the electromagnetic induction.

A frequency of the A.C. current generated in the high-frequency electric power generating circuit 212 is set identical to the self-resonant frequency of each of the sympathetic resonance elements 2112 and 312.

The sympathetic resonance element 2112 and the sympathetic resonance element 312 are disposed so as to show the magnetic field sympathetic resonance relationship. Also, the A.C. current is supplied from the sympathetic resonance element 2112 to the sympathetic resonance element 312 at the sympathetic resonant frequency in the wireless (non-contact) manner.

On the power receiving side, the current is supplied from the sympathetic resonance element 312 to the power feeding element 311 through the electromagnetic induction. Also, the D.C. current is created by the rectifying circuit 32 to be outputted.

Figure 7:
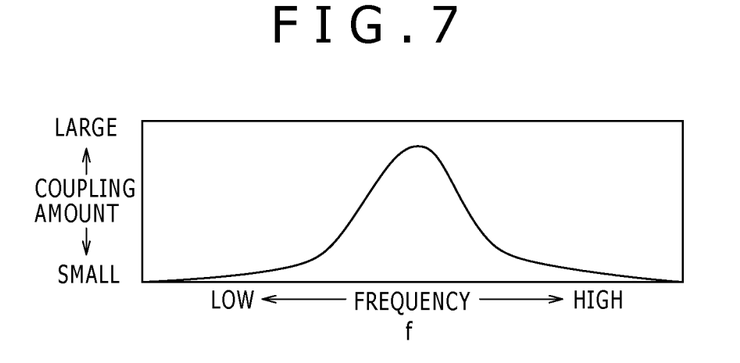
FIG. 7 is a graphical representation showing frequency characteristics of a coupling amount in the magnetic field sympathetic resonance system.

FIG. 7 is a graphical representation showing frequency characteristics of the coupling amount in the magnetic field sympathetic resonance system.

In FIG. 7, an axis of abscissa indicates a frequency, f, of an A.C. power source, and an axis of ordinate indicates a coupling amount.

FIG. 7 shows a relationship between the frequency of the A.C. power source and the coupling amount.

It is understood from FIG. 7 that frequency selectivity is shown due to the magnetic field sympathetic resonance.

Figure 8:
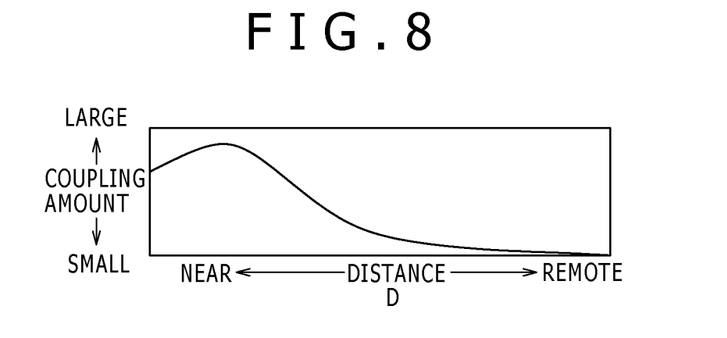
FIG. 8 is a graphical representation showing a relationship between a distance between sympathetic resonance coils, and a coupling amount in the magnetic field sympathetic resonance system.

FIG. 8 is a graphical representation showing a relationship between a distance between sympathetic resonance elements, and a coupling amount in the magnetic field sympathetic resonance system.

In FIG. 8, an axis of abscissa indicates the distance D between the sympathetic resonance elements, and an axis of ordinate indicates the coupling amount.

FIG. 8 shows a relationship between the distance D between the sympathetic resonance element 2112 on the power feeding side and the sympathetic resonance element 312 on the power receiving side, and the coupling amount.

It is understood from FIG. 8 that there is the distance D at which the coupling amount becomes maximum at a certain sympathetic resonance frequency.

Figure 9:
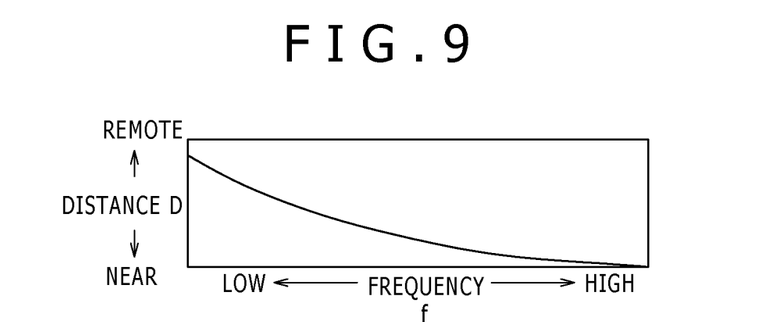
FIG. 9 is a graphical representation showing a relationship between a sympathetic resonance frequency and a distance between the sympathetic resonance coils in which a maximum coupling amount is obtained in the magnetic field sympathetic resonance system.

FIG. 9 is a graphical representation showing a relationship between the sympathetic resonance frequency and a distance between sympathetic resonance elements at which a maximum coupling amount is obtained in the magnetic field sympathetic resonance system.

In FIG. 9, an axis of abscissa indicates a sympathetic resonance frequency f, and an axis of ordinate indicates a distance D between sympathetic resonance elements.

FIG. 9 shows a relationship between the sympathetic resonance frequency and the distance D between the sympathetic resonance element 2112 on the power feeding side, and the sympathetic resonance element 312 on the power receiving side at which a maximum coupling amount is obtained.

It is understood from FIG. 9 that when the sympathetic resonance frequency is low, the interval of the sympathetic resonance elements is widened, and when the sympathetic resonance frequency is high, the interval of the sympathetic resonance elements is narrowed, thereby obtaining the maximum coupling amount.

As has been described, the basic requirement of the first embodiment is the wireless power feeding system 10 which is realized within the magnetically closed space.

For the purpose of forming the magnetically closed space, the magnetic material is wound around and mounted to the external wall of the storage body 22. Thus, the magnetically shielding construction is obtained. As a result, the magnetic field generated inside the magnetically closed space does not leak to the outside of the magnetically closed space. In addition, as will be described later, since the normal magnetic field sympathetic resonance type wireless power feeding system can be operated inside the magnetically closed space, the electric power transmission in which the distance between the coils is increased can be carried out.

In the first embodiment, the magnetically closed space is formed in the form of box-type one with a drawer.

The power feeding side coil is installed below the drawer and feeds the electric power to the power receiving apparatus 30 side put in the second storage portion 223 as an upper stage drawer. In this case, the power receiving apparatus 30 side, for example, is a portable electronic apparatus, and the power receiving coil is incorporated inside the portable electronic apparatus.

The magnetic material is mounted along the wall surface of the main body 221 of the storage body 22.

Since when the drawer is drawn, the magnetic material is divided and the electromagnetic field leaks to the outside of the box-like storage body 22, the detecting portion 224 composed of a switch is disposed for the purpose of stopping the power feeding.

As a result, the drawer is closed on a constant basis during the power feeding, thereby making it possible to prevent the electromagnetic field from leaking to the outside.

2. Second Embodiment of Wireless Power Feeding System

Figure 10:
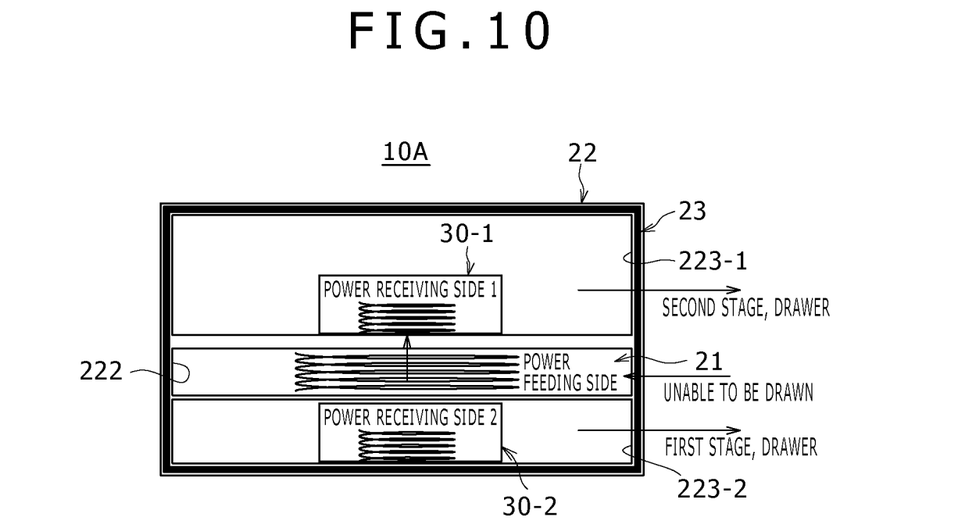
FIG. 10 is a view showing a configuration of the wireless power feeding system according to a second embodiment of the present disclosure.

FIG. 10 is a view showing a configuration of the wireless power feeding system according to a second embodiment of the present disclosure.

The second embodiment of the wireless power feeding system 10A is different from the first embodiment of the wireless power feeding system 10 in that second storage portions each serving as a drawer are disposed in an upper stage and a lower stage, correspondingly, so as to sandwich the first storage portion 222 between them.

In this case, a distance between the power feeding portion 21 and a power receiving apparatus 30-1 stored in the second storage portion 223-1, and a distance between the power feeding portion 21 and a power receiving apparatus 30-2 stored in the second storage portion 223-2 are approximately equal to each other for the second storage portions 223-1 and 223-2.

3. Third Embodiment of Wireless Power Feeding System

Figure 11:
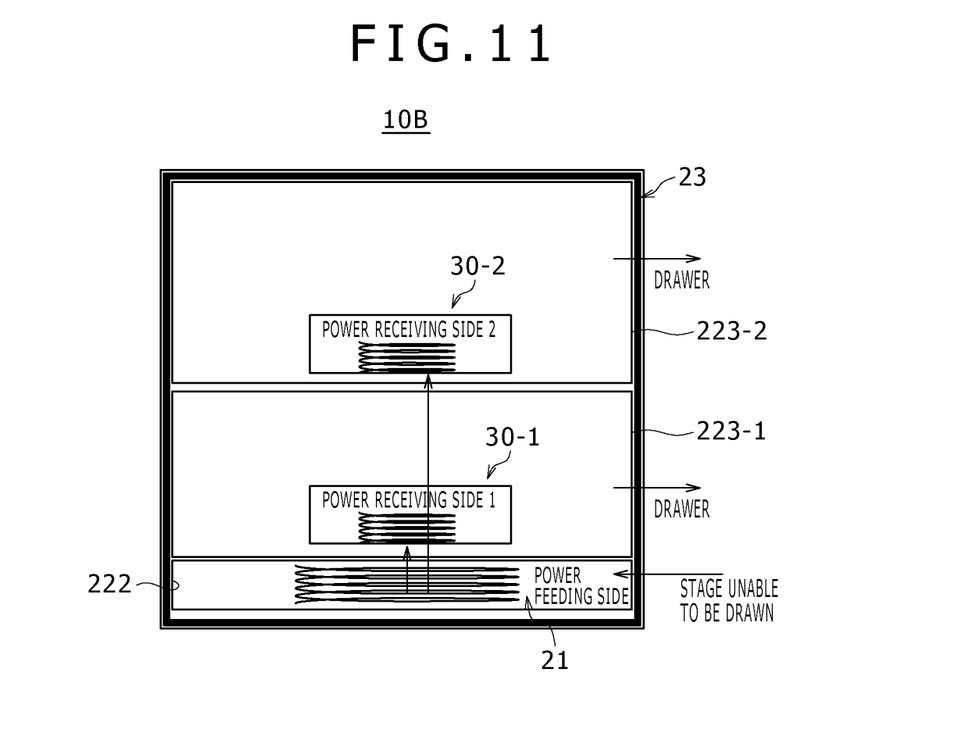
FIG. 11 is a view showing a configuration of the wireless power feeding system according to a third embodiment of the present disclosure.

FIG. 11 is a view showing a configuration of the wireless power feeding system according to a third embodiment of the present disclosure.

The third embodiment of the wireless power feeding system 10B is different from the first embodiment of the wireless power feeding system 10 in that the second storage portions each serving as the drawer are disposed in two stages above the first storage portion 222.

That is to say, in the third embodiment of the wireless power feeding system 10B, the power receiving sides are constructed in the form of drawers of two or more stages for the power feeding portion 21 side, and thus a construction is adopted such that a difference between the power feeding side coil and the power receiving side coil is changed depending on the drawers. As a result, the received electric power can be changed depending on the drawers. In a word, the priorities for the power feeding can be added to the second storage portions 223-1 and 223-2 each serving the drawers.

When plural power receiving sides are provided, the electric power is dispersed if the plural power receiving sides receive the electric powers, which are comparable to one another. There is also a need such that an electronic apparatus or the like which is wanted to be immediately used is desired to be preferentially changed. In such a case, the priorities are added by utilizing the method or the like in the third embodiment, thereby making it possible to enhance the convenience.

4. Fourth Embodiment of Wireless Power Feeding System

Figure 12:
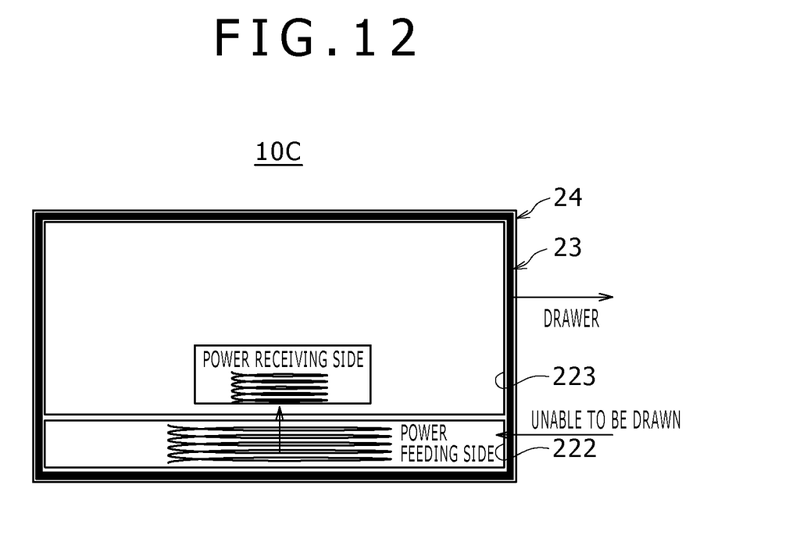
FIG. 12 is a view showing a configuration of the wireless power feeding system according to a fourth embodiment of the present disclosure.

FIG. 12 is a view showing a configuration of the wireless power feeding system according to a fourth embodiment of the present disclosure.

Points of difference between the fourth embodiment of the wireless power feeding system 10C and the first embodiment of the wireless power feeding system 10 are as follows.

That is to say, in the wireless power feeding system 10C, in addition to the magnetic material, an electric field shielding portion 24 is formed in the outer peripheral portion of the storage body 22. Thus, the second storage portion 223 forms an electromagnetically closed space in a state of being stored in the main body.

The electric field shielding portion 24 is formed from either a metallic plate or a metallic foil on an exterior appearance portion and, for example, has a function as well as a dressed plate.

In the fourth embodiment, in the external wall of the box-like main body, an external portion of the magnetic material is covered with a metallic wall, and thus the leakage of the electromagnetic field to the outside can be more perfectly shielded.

This construction can also be applied to any of other embodiments of the wireless power feeding system.

5. Fifth Embodiment of Wireless Power Feeding System

Figure 13:
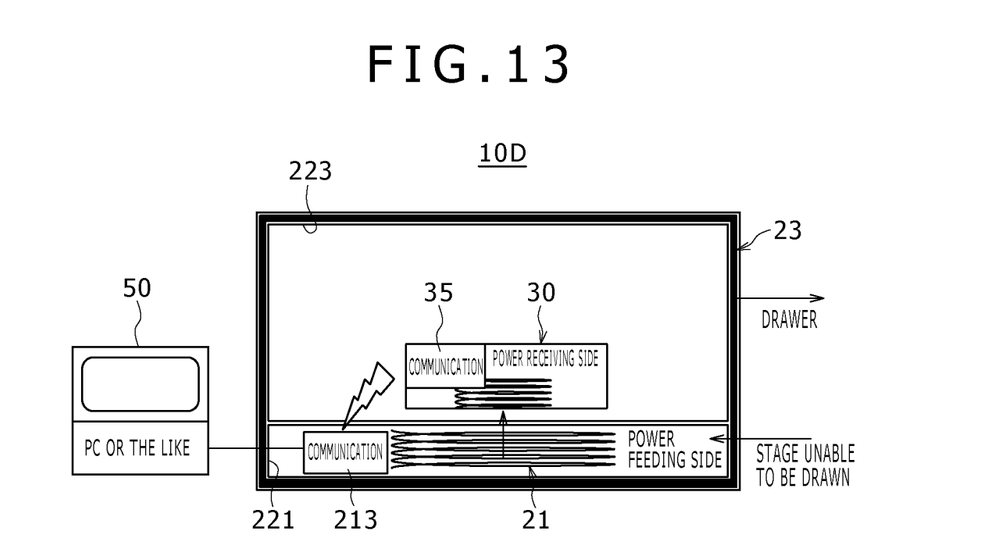
FIG. 13 is a view showing a configuration of the wireless power feeding system according to a fifth embodiment of the present disclosure.

FIG. 13 is a view showing a configuration of the wireless power feeding system according to a fifth embodiment of the present disclosure.

A point of difference between the fifth embodiment of the wireless power feeding system 10D and the first embodiment of the wireless power feeding system 10 is as follows.

In the wireless power feeding system 10D, wireless communicating portions 213 and 35 are provided in the power feeding portion 21 and the power receiving apparatus 30, respectively.

When a communicating function (such as a Bluetooth or a wireless LAN) is also provided in the wireless power feeding system 10D, and the power feeding main body and a personal computer (PC) 50 or the like are connected to each other through a suitable network, data in the power receiving side electronic apparatus can be perused, taken on or sent from an external PC.

By adopting such a configuration, the user, for example, can peruse the data in the electronic apparatus during charging and as a result, the convenience is enhanced.

In addition, although it is feared that the wireless communication is interrupted, in the fifth embodiment, the wireless communication is also carried out in the closed space shielded by either the magnetic sheet or the metallic plate. Therefore, the electric wave is prevented from leaking to the outside, and thus is not feared to be interrupted.

6. Sixth Embodiment of Wireless Power Feeding System

Figures 14A, 14B:
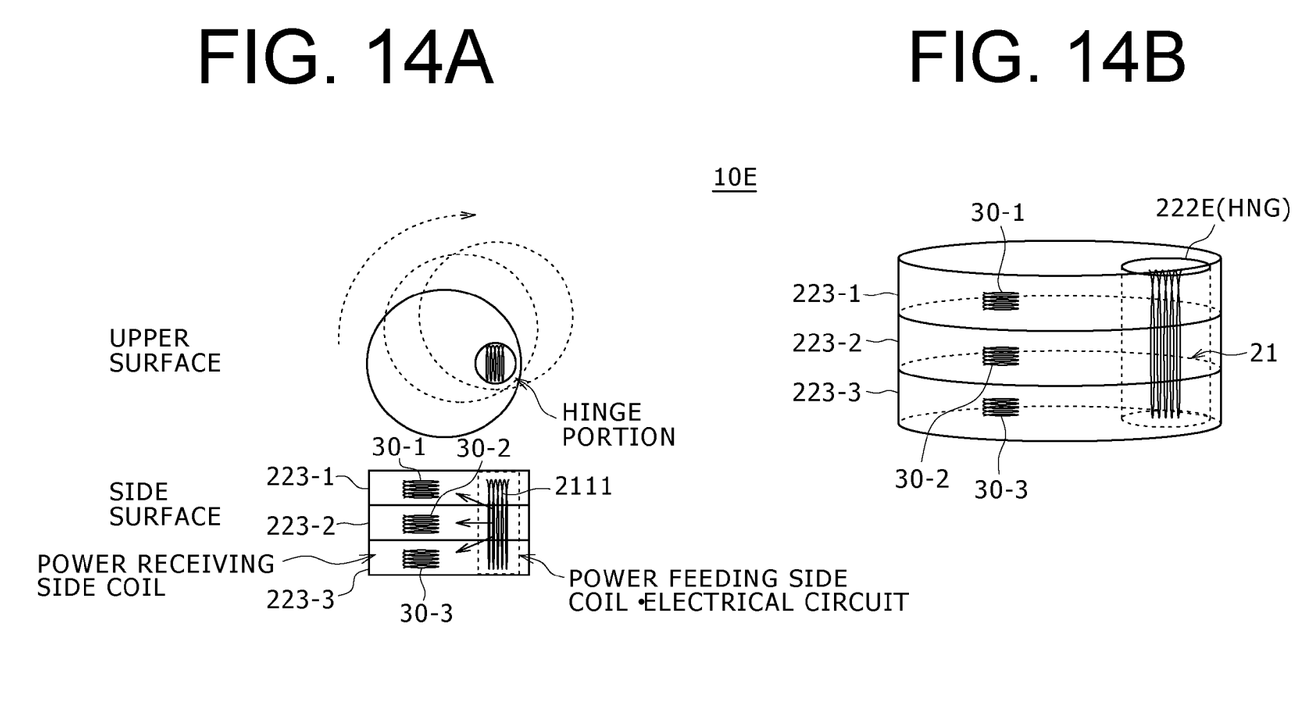
FIGS. 14A and 14B are respectively views showing a configuration of the wireless power feeding system according to a sixth embodiment of the present disclosure.

FIG. 14 is a view showing a configuration of the wireless power feeding system according to a sixth embodiment of the present disclosure.

Points of difference between the sixth embodiment of the wireless power feeding system 10E and the first embodiment of the wireless power feeding system 10 are as follows.

In the sixth embodiment, in the storage body 22E of a power feeding apparatus 20E, the first storage portion 222E is formed as a hinge portion HNG for storing therein the power feeding portion 21. Also, the second storage portions 223-1 to 223-3 are mounted so as to pivot around the hinge portion HNG.

In the sixth embodiment, the hinge portion HNG is formed so as to have a cylindrical shape. Also, end portions of the second storage portions 223-1 to 223-3 are rotatably supported by the cylindrical portion. Thus, the second storage portions 223-1 to 223-3 are formed pivotably around the hinge portion HNG.

In the sixth embodiment, the storage body 22E includes a first storage portion 222E as the hinge portion HNG, and the two or more stages of the second storage portions, in this case, the three second storage portions 223-1 to 223-3. Also, the three second storage portions 223-1 to 223-3 are operated like a fan with the axis as a center. As a result, the user can store and take out an article(s) in and from each of the three second storage portions 223-1 to 223-3.

Also, in the magnetic field sympathetic resonance type wireless power feeding system 10E which is realized inside the box-like portion as described above, both a power feeding coil and an electrical circuit for power feeding are disposed inside the fixed hinge portion HNG.

7. Seventh Embodiment of Wireless Power Feeding System

Figure 15:
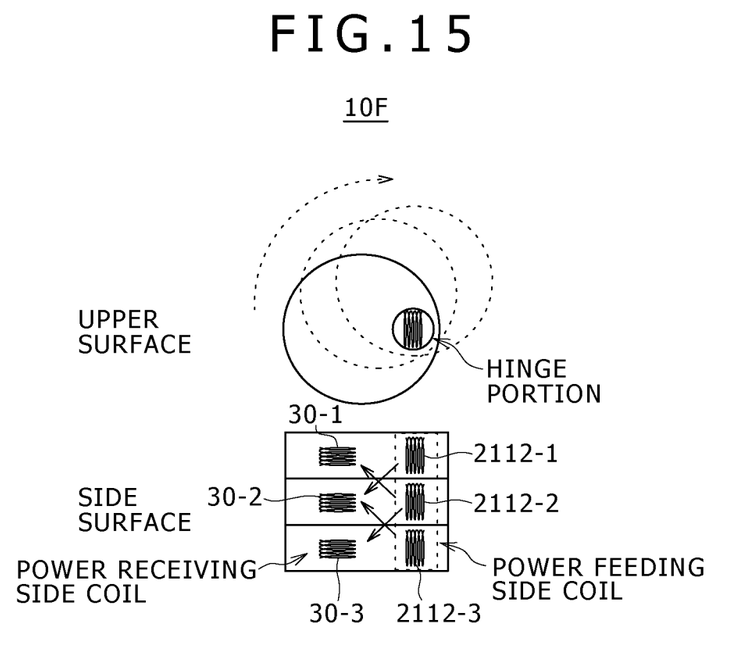
FIG. 15 is a view showing a configuration of the wireless power feeding system according to a seventh embodiment of the present disclosure.

FIG. 15 is a view showing a configuration of the wireless power feeding system according to a seventh embodiment of the present disclosure.

Figure 16:
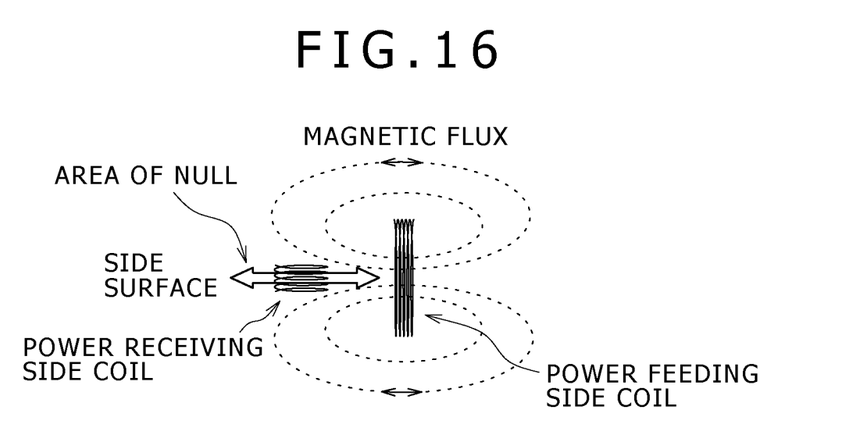
FIG. 16 is a view explaining an example when a null is generated in the wireless power feeding system.

FIG. 16 is a view explaining an example when a null is generated in the wireless power feeding system.

A point of difference between the seventh embodiment of the wireless power feeding system 10F and the sixth embodiment of the wireless power feeding system 10E is as follows.

Variation of Example 2

In the case of the sixth embodiment, when a positional relationship between the power feeding side coil and the power receiving side coil is as shown in FIG. 16, it may be impossible to carry out the transmission of the electric power (null) in some cases.

In order to solve such cases, in the seventh embodiment, plural power feeding source coils 2112-1 to 2112-3 are disposed in the hinge portion HNG so as not to be orthogonal to the coils on the power receiving apparatus side. Also, the electric power is fed by using the power feeding source coils 2112-1 to 2112-3 to solve an area of the null.

In addition, the electric power is fed in a time division manner because when the electric powers are fed at the same time from the power feeding coils different from one another, the electric powers interfere with one another in some cases.

In addition, similarly to the case of the first embodiment, the state in which a shelf is closed is detected by a detecting portion composed of a switch to start the power feeding, thereby making it possible to remove the unnecessary radiation.

As has been described so far, according to the first to seventh embodiments of the wireless power feeding system, the following effects can be obtained.

That is to say, according to the seventh embodiment, since the distance between the coils can be largely increased, and the remote electromagnetic field intensity can be largely attenuated while the near magnetic field intensity is maintained, the following advantages are obtained.

Since the wireless electric power transmission for the large electric power can be carried out while values of laws and regulators, and guidelines in countries are fulfilled, it is also possible to cope with super rapid charging or the like for which the large electric power transmission is required.

For example, when not only the wireless electric power transmission, but also the wireless data communication is carried out, it is possible to avoid the danger that the communication electric wave is interrupted.

In addition, the charging for a wearable electric apparatus can be carried out without being accompanied by any of hassles.

Figure 17:
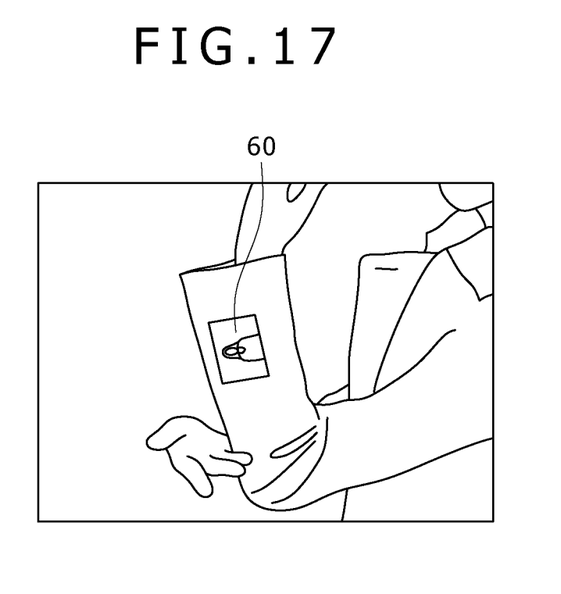
FIG. 17 is a view showing an example in which an electric apparatus is incorporated in a clothing.

Note that, in each of the first to seventh embodiments, when as shown in FIG. 17, an electronic apparatus 60 having a secondary battery, for example, is buried in clothing, a power source for driving the electronic apparatus 60 is also preferably incorporated in the clothing.

In addition, it is also trouble to detach the electronic apparatus 60 or the power source from the clothing for the purpose of charging the power source.

Figure 18:
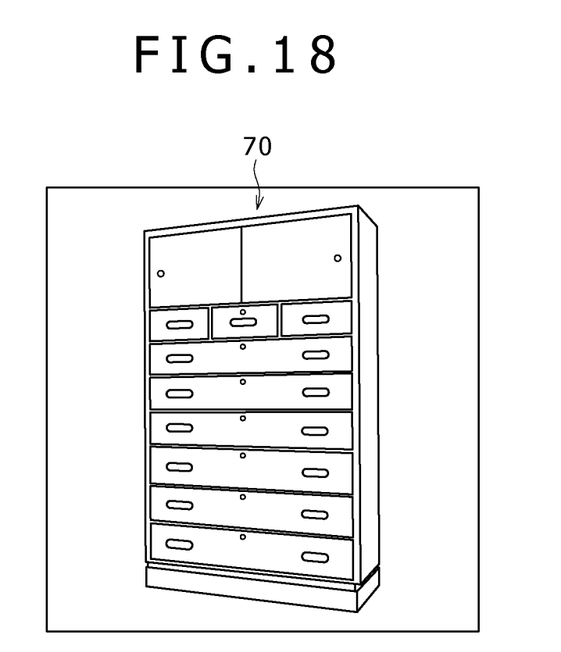
FIG. 18 is a view showing an example of a clothing drawer as a storage body.

Therefore, it is useful that the wireless power feeding apparatus is provided in a clothing drawer 70 as shown in FIG. 18.

In each of the first to seventh embodiments, it is also possible to apply a relay device for relaying the electric power being fed in order to feed the electric power to the power receiving apparatus 30 side.

The present disclosure contains subject matter related to that disclosed in Japanese Priority Patent Application JP 2010-156548 filed in the Japan Patent Office on Jul. 9, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A power feeding apparatus, comprising:
    a power feeding portion adapted to feed an electric power in a wireless manner; and
    a storage body storing therein said power feeding portion, wherein,
        (a) said storage body includes
            (1) a main body,
            (2) a first storage portion within said main body and within which said power feeding portion is located, and
            (3) at least one second storage portion within which a power receiving apparatus can be located,
        (b) each second storage portion being (i) displaceable relative to the main body and (ii) such that the power receiving apparatus can be introduced thereinto and retrieved therefrom,
        (c) the main body comprises a closed magnetically shielding portion in an outer periphery thereof, and
        (d) for each second storage portion, a moveable portion of the outer periphery of the main body and the magnetic shielding portion is moveable relative to the main body to allow access to an interior of the second storage portion.

2. The power feeding apparatus according to claim 1, wherein:

said storage body includes a detecting portion that detects whether said at least one second storage portion is stored within said main body or retrieved from said main body, and said power feeding portion includes a control portion that allows the power feeding portion to feed power when said detecting portion detects that said at least one second storage portion is stored within said main body, and stops the power feeding portion from feeding power when said detecting portion detects that said second storage portion is retrieved from said main body.

3. The power feeding apparatus according to claim 1, wherein the storage body comprises an electric field shielding portion in an outer peripheral portion of said storage body that forms an electromagnetically shielding closed space when said moveable portion of the outer periphery of said main body is aligned with the outer periphery of the main body.

4. The power feeding apparatus according to claim 1 comprising plural second storage portions which are equidistant from the first storage portion.

5. The power feeding apparatus according to claim 1 comprising plural second storage portions.

6. The power feeding apparatus according to claim 1, wherein:
in said storage body, said first storage portion is a hinge portion within which is stored said power feeding portion, and
said at least one second storage portion is mounted so as to pivot around said hinge portion.

7. The power feeding apparatus according to claim 6, wherein:
said storage body includes plural second storage portions,
the power feeding portion comprises plural power transmitting coil portions each corresponding to a respective one of the plural second storage portions, the power transmitting coil portions disposed in said hinge portion, and
said power feeding apparatus is configured to selectively drive said power transmitting coil portions.

8. A wireless power feeding system, comprising:
a power feeding apparatus; and
a power receiving apparatus that receives electric power fed from said power feeding apparatus via a magnetic field sympathetic resonance relationship,
wherein,
(a) said power feeding apparatus includes
(1) a power feeding portion that feeds electric power in a wireless manner, and
(2) a storage body in which said power feeding portion is located,
(b) said storage body includes
(1) a main body,
(2) a first storage portion within said main body and in which said power feeding portion is located, and
(3) at least one second storage portion within which a power receiving apparatus can be located
(c) each second storage portion being (i) displaceable relative to the main body and (ii) such that the power receiving apparatus can be introduced thereinto and retrieved therefrom
(d) the main body comprises a closed magnetically shielding portion in an outer periphery thereof, and
(e) for each second storage portion, a moveable portion of the outer periphery of the main body and the magnetic shielding portion is moveable relative to the main body to allow access to an interior of the second storage portion.

9. The wireless power feeding system according to claim 8, wherein
said storage body includes a detecting portion that detects whether said at least one second storage portion stored within or retrieved from said main body, and
said power feeding portion includes a control portion that allows the power feeding portion to feed power when said detecting portion detects that said at least second storage portion is stored within said main body, and stops the power feeding portion from feeding power when said detecting portion detects that said second storage portion retrieved from said main body.

10. The wireless power feeding system according to claim 8, wherein the storage body comprises an electric field shielding portion in an outer peripheral portion of said storage body that forms an electromagnetically shielding closed space when said moveable portion of the outer periphery of the main body is aligned with the outer periphery of the main body.

11. The wireless power feeding system according to claim 9 comprising plural second storage portions that are equidistant from the first storage portion.

12. The wireless power feeding system according to claim 8 comprising plural second storage portions.

13. The wireless power feeding system according to claim 8, wherein
in said storage body, said first storage portion is formed as a hinge portion within which said power feeding portion is located, and
said at least one second storage portion is mounted so as to pivot around said hinge portion.

14. The wireless power feeding system according to claim 13, wherein:
said storage body includes plural second storage portions,
the power feeding portion comprises plural power transmitting coil portions each corresponding to a respective one of the plural second storage portions, the power transmitting coil portions disposed in said hinge portion, and
said power feeding apparatus is configured to selectively drive said power transmitting coil portions.

* * * * *